(12) United States Patent  
Hiratsuka et al.

(10) Patent No.: US 9,316,874 B2  
(45) Date of Patent: Apr. 19, 2016

(54) LIQUID CRYSTAL DISPLAY DEVICE (71) Applicant: Japan Display Inc., Tokyo (JP)

(72) Inventors: Takato Hiratsuka, Tokyo (JP); Osamu Itou, Tokyo (JP); Daisuke Sonoda, Tokyo (JP); Toshimasa Ishigaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/065,457

(22) Filed: Oct. 29, 2013

(65) Prior Publication Data

US 2014/0132865 A1    May 15, 2014

(30) Foreign Application Priority Data

Nov. 9, 2012  (JP) ................................ 2012-247907

(51) Int. Cl.  
*G02F 1/1343* (2006.01)  
*G02F 1/1337* (2006.01)

(52) U.S. Cl.  
CPC .... G02F 1/134363 (2013.01); *G02F 1/133707* (2013.01); *G02F 2201/40* (2013.01); *G02F 2203/30* (2013.01)

(58) Field of Classification Search  
None  
See application file for complete search history.

(56) References Cited

U.S. PATENT DOCUMENTS

| 2005/0146658 | A1* | 7/2005 | Kim et al. ........................ 349/114 |
| 2008/0259257 | A1* | 10/2008 | Aota et al. ...................... 349/106 |
| 2010/0302492 | A1* | 12/2010 | Kubota et al. .................. 349/138 |
| 2013/0148067 | A1* | 6/2013 | Wang .............................. 349/138 |
| 2014/0293199 | A1* | 10/2014 | Sakae ............... G02F 1/134363 349/106 |

FOREIGN PATENT DOCUMENTS

JP    6-214244    8/1994

* cited by examiner

*Primary Examiner* — Dung Nguyen  
*Assistant Examiner* — Shan Liu  
(74) *Attorney, Agent, or Firm* — Typha IP LLC (57) ABSTRACT

A liquid crystal display device has a pair of wall electrodes facing each other, which is disposed on pixels on a first substrate, functions as one of pixel electrodes and a common electrode, and takes a posture of standing on the first substrate. Also, the liquid crystal display device has a center electrode that is disposed between the pair of wall electrodes, functions as the other of the pixel electrodes and the common electrode, has a convexity lower in height than the pair of wall electrodes, and makes a width in a direction along which the pair of wall electrodes faces each other gradually smaller toward the second substrate. According to this liquid crystal display device, since a vertical electric field can be prevented from being developed on an upper side of the center electrode, a transmittance of light can be improved.

7 Claims, 8 Drawing Sheets

LIQUID CRYSTAL DISPLAY DEVICE

CROSS-REFERENCE TO RELATED APPLICATION

The present application claims priority from Japanese application JP2012-247907 filed on Nov. 9, 2012, the content of which is hereby incorporated by reference into this application.

BACKGROUND OF THE INVENTION

1. Field of the Invention

The present invention relates to a liquid crystal display device of an IPS (in-plane-switching) system.

2. Description of the Related Art

Among the liquid crystal display devices of the IPS system, there is a liquid crystal display device having two wall-shaped electrodes (hereinafter called wall electrodes) in each of pixels, for example, as proposed in JP 1994-214244 A. One of the wall electrodes functions as a pixel electrode, and the other wall electrode functions as a common electrode. When a voltage corresponding to a gradation value of the pixel is applied to the pixel electrode, a horizontal electric field is developed between the pixel electrode and the common electrode, the electric field causes liquid crystal molecules to rotate, and a light is transmitted through a liquid crystal layer.

SUMMARY OF THE INVENTION

The present inventors have studied the liquid crystal display device having the wall electrodes structured as follows. That is, wall portions high in height (hereinafter referred to as high wall insulating portions) are formed at two edges located on opposite sides of each pixel, and electrodes (hereinafter referred to as wall electrodes) are formed on opposite side surfaces of the two high wall insulating portions. Also, a wall portion (hereinafter referred to as low wall insulating portion) lower in height than the high wall insulating portions is formed between the two high wall insulating portions, and an electrode is formed on an upper surface and a side surface of the low wall insulating portion (hereinafter referred to as center electrode). The wall electrodes are, for example, the pixel electrodes, and the center electrode is, for example, the common electrode. According to this structure, a liquid crystal layer is also formed above the center electrode, and an improvement in the transmittance of a light can be expected.

However, in a structure in which the low wall insulating portion has a rectangular cross-section, a vertical electric field is developed in the upper surface of the center electrode. For that reason, it is difficult to rotate the liquid crystal molecules above the center electrode and, the transmission of a light is limited. If a width of the low wall insulating portion can be reduced, a width of the upper surface of the center electrode is also reduced with the result that the development of the vertical electric field is suppressed. However, if the width of the low wall insulting portion is more reduced, an aspect ratio of the low wall insulating portion becomes higher to thereby make it difficult to stably form the low wall insulating portion having a smaller wall.

The present invention aims at providing a liquid crystal display device that can improve the transmittance of a light.

(1) According to the present invention, there is provided a liquid crystal display device including: a first substrate that has a plurality of scanning signal lines, a plurality of video signal lines that intersects with the plurality of scanning signal lines, and a plurality of pixels each being surrounded by two adjacent scanning signal lines and two adjacent video signal lines; a second substrate that faces the first substrate; and a liquid crystal layer that is disposed between the first substrate and the second substrate. The liquid crystal display device also includes a pair of wall electrodes facing each other which is each disposed on the first substrate, functions as one of pixel electrodes and a common electrode, is formed on each of the plurality of pixels, and takes a posture of standing on the first substrate. The liquid crystal display device further includes a center electrode that is disposed on the first substrate, functions the other of the pixel electrodes and the common electrode, extends along the pair of wall electrodes between the pair of wall electrodes, has a convexity lower in height than the pair of wall electrodes, and makes a width in a direction along which the pair of wall electrodes faces each other gradually smaller toward the second substrate. According to the present invention, the transmittance of a light in the liquid crystal display device can be improved.

(2) According to an aspect of the present invention, a pair of high wall insulating portions is each located on two edges positioned on opposite sides of each of the pixels, a low wall insulating portion that has a height lower than the pair of high wall insulating portions, and has a width in the direction along which the pair of wall electrodes faces each other gradually smaller toward the second substrate is formed between the pair of high wall insulating portions, the pair of wall electrodes is formed on each side wall of the pair of high wall insulating portions, and the center electrode is formed on an outer surface of the low wall insulating portion. According to this structure, the wall electrodes and the center electrode can be easily formed.

(3) A cross-section of the low wall insulating portion which is orthogonal to an extending direction of the low wall insulating portion may be triangular. According to this structure, the transmittance of the light can be more effectively improved.

(4) A cross-section of the low wall insulating portion which is orthogonal to an extending direction of the low wall insulating portion may be trapezoidal. According to this structure, the wall electrodes and the center electrode can be easily formed.

(5) The other electrode having the center electrode may be covered with an insulating film, the one electrode including the pair of wall electrodes may be formed on the low wall insulating portion, and include a portion facing the center electrode through the insulating film. According to this structure, a fringe electric field can be formed between the portion provided in the one of the pixel electrodes and the common electrode, and the center electrode. As a result, the liquid crystal molecules can be more properly rotated.

BRIEF DESCRIPTION OF THE DRAWINGS

FIGS. 3A and 3B are diagrams illustrating an electric field developed in the liquid crystal display device, in which FIG. 3A illustrates an electric field developed in a comparative example of the liquid crystal display device illustrated in FIG. 1, and FIG. 3B illustrates an electric field developed in the liquid crystal display device illustrated in FIG. 3B;

DETAILED DESCRIPTION OF THE INVENTION

Figure 1:
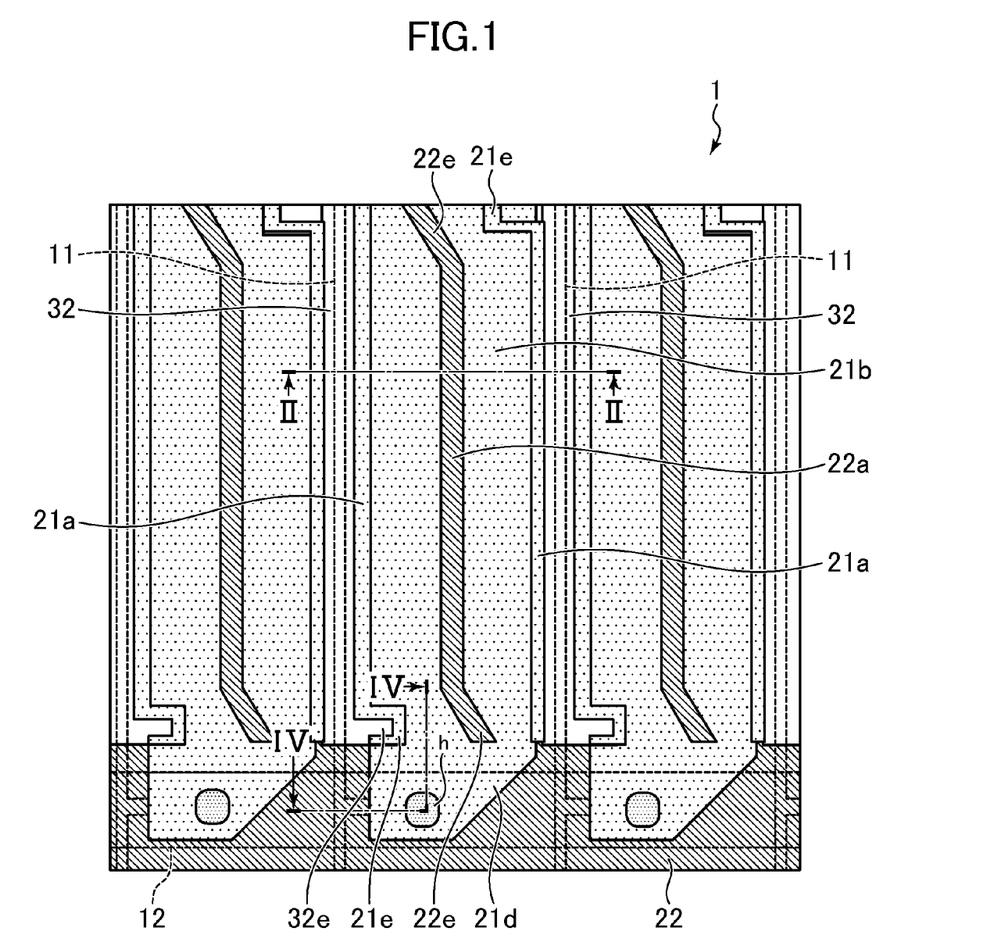
FIG. 1 is a plan view of a first substrate provided in a liquid crystal display device according to the present invention.
Figure 2:
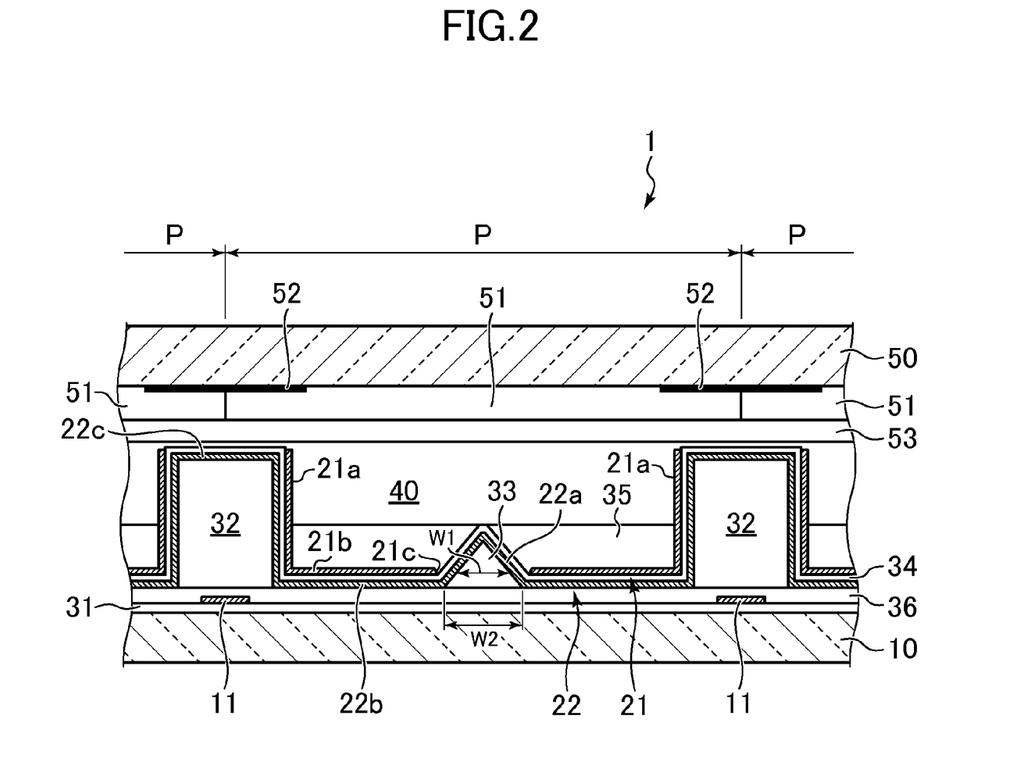
FIG. 2 is a cross-sectional view of the liquid crystal display device taken along a line II-II illustrated in FIG. 1.
Figure 3:
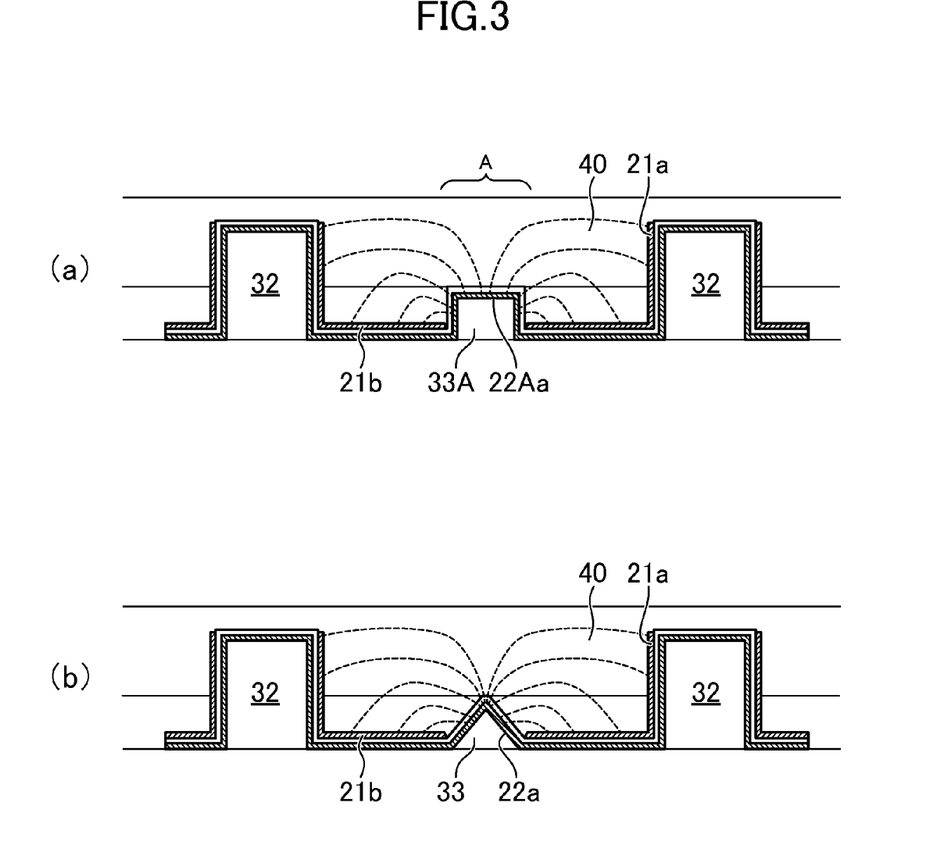

Hereinafter, an embodiment of the present invention will be described with reference to the accompanying drawings. FIG. 1 is a plan view of a first substrate 10 provided in a liquid crystal display device 1 according to the present invention. FIG. 2 is a cross-sectional view of the liquid crystal display device 1 taken along a line II-II illustrated in FIG. 1. FIGS. 3A and 3B are diagrams illustrating an electric field developed in the liquid crystal display device 1, in which FIG. 3A illustrates an electric field developed in a comparative example of the liquid crystal display device 1 illustrated in FIG. 1, which illustrates an electric field developed in a structure where a low wall insulating portion to be described later has a rectangular cross-sectional shape. FIG. 3B illustrates an electric field developed in the liquid crystal display device 1 illustrated in FIG. 3B. In FIG. 2, an area indicated by symbol P represents one pixel.

As illustrated in FIG. 2, the liquid crystal display device 1 includes a first substrate 10 and a second substrate 50 which face each other. The substrates 10 and 50 are transparent substrates made of glass or resin. The first substrate 10 is a TFT substrate on which thin film transistors T (refer to FIG. 4) to be described later are formed, and the second substrate 50 is a color filter substrate on which color filters 51 are formed. A liquid crystal layer 40 is formed between the first substrate 10 and the second substrate 50. Polarizing plates are each arranged on an opposite side of the first substrate 10 to the second substrate 50, and an opposite side of the second substrate 50 to the first substrate 10. The opposite side of the first substrate 10 to the second substrate 50 is irradiated with a light from a backlight unit not shown.

As illustrated in FIG. 1, the first substrate 10 is formed with a plurality of video signal lines 11 and a plurality of scanning signal lines 12 that intersects with the video signal lines 11. The first substrate 10 is formed with a plurality of pixels. Each of the pixels is surrounded by two adjacent video signal lines 11, and two adjacent scanning signal lines 12. The video signal lines 11 are each added with a voltage (gradation voltage) corresponding to a gradation value of each pixel, and the scanning signal lines 12 are each applied with a gate voltage for turning on a thin film transistor T which will be described later.

As illustrated in FIG. 2, the first substrate 10 is formed with a pair of high wall insulating portions 32 that stands on the first substrate 10. In this example, the first substrate 10 is formed with a gate insulating film 31 and an insulating film 36, and the high wall insulating portions 32 is formed on the insulating film 36 formed on the gate insulating film 31. A pair of high wall insulating portions 32 is each formed at two edges located on opposite sides of each pixel. That is, the high wall insulating portions 32 is each formed on a boundary between the two adjacent pixels. The high wall insulating portions 32 are located at an upper side (second substrate 50 side) of the video signal lines 11, and extend along the video signal lines 11 (refer to FIG. 1). A cross-section of the high wall insulating portions 32 which is orthogonal to an extending direction of the high wall insulating portions 32 is substantially rectangular. That is, a side surface of the high wall insulating portions 32 is substantially perpendicular to the first substrate 10.

The first substrate 10 is formed with a low wall insulating portion 33 lower in height than the pair of high wall insulating portions 32. The low wall insulating portion 33 is located between the pair of high wall insulating portions 32. More specifically, the low wall insulating portion 33 is formed at a center position between the pair of high wall insulating portions 32, and extends in an extending direction of the high wall insulating portions 32. The low wall insulating portion 33 is formed on the insulating film 36 as with the high wall insulating portions 32.

The high wall insulating portions 32 and the low wall insulating portion 33 are each made of an insulating material. The low wall insulating portion 33 is made of a transparent insulating material. The high wall insulating portions 32 are also made of, for example, a transparent insulating material. The high wall insulating portions 32 and the low wall insulating portion 33 are made of, for example, the same material. In this case, the high wall insulating portions 32 and the low wall insulating portion 33 can be formed in the same process. That is, the high wall insulating portions 32 and the low wall insulating portion 33 can be formed with the use of a common mask. As a result, the number of processes for manufacturing the liquid crystal display device 1 can be reduced, and a distance between one of the high wall insulating portions 32 and the low wall insulating portion 33 can be set to be equal to a distance between the other high wall insulating portion 32 and the low wall insulating portion 33 with a high precision. That is, a distance between one wall electrode portion 21a of a pair of wall electrode portions 21a, and a center electrode portion 22a, which will be described later, can be set to be equal to a distance between the other wall electrode portion 21a and the center electrode portion 22a with a high precision. As a result, an electric field developed in the liquid crystal layer 40 becomes symmetric about the center electrode portion 22a, and the transmittance of a light can be equalized in each pixel. The material of the high wall insulating portions 32 and the material of the low wall insulating portion 33 may be different from each other. Also, an insulating material of the high wall insulating portions 32 may not always be transparent.

As illustrated in FIG. 2, the first substrate 10 is formed with a first electrode 21 which is one of pixel electrodes and a common electrode, and a second electrode 22 which is the other of the pixel electrodes and the common electrode. In an example described here, the first electrode 21 is the pixel electrodes, and the second electrode 22 is the common electrode. That is, the first electrode 21 is applied with the gradation voltage from the video signal lines 11 through the thin film transistor T which will be described later. A connection structure of the first electrode 21 and the thin film transistor T will be described in detail later. The second electrode 22 is set to a potential which is a standard for a potential of the first electrode 21. In this example, because the first electrode 21 is the pixel electrode, the first electrode 21 is disposed in each of a plurality of pixels. In this example, because the second electrode 22 is the common electrode, the second electrode 22 is disposed over the plurality of pixels. The first electrode 21 and the second electrode 22 are each formed of a transparent conductive film such as ITO (indium tin oxide).

As illustrated in FIG. 2, the first electrode 21 includes a pair of wall electrode portions 21a. The pair of wall electrode portions 21a is formed on the respective side surfaces of the pair of high wall insulating portions 32, and takes a posture of standing on the first substrate 10. As described above, because the pair of high wall insulating portions 32 is formed on the respective two edges located on the opposite sides of each pixel, the pair of wall electrode portions 21a is each located on one side of each pixel (position closer to one of two adjacent video signal lines 11) and the other side thereof (position closer to the other video signal line 11). The pair of wall electrode portions 21a face each other in the extending direction of the scanning signal lines 12. A height of the wall electrode portions 21a corresponds to a height of the high wall insulating portions 32. In the example illustrated in FIG. 2, the height of the high wall insulating portions 32 corresponds to a total thickness of the liquid crystal layer 40 and an insulating film 35 that will be described later. As a result, the height of the wall electrode portions 21a also corresponds to the total thickness of the liquid crystal layer 40 and the insulating film 35 that will be described later, and an upper edge of the wall electrode portions 21a comes close to the second substrate 50. Each of the height of the high wall insulating portions 32 and the height of the wall electrode portions 21a may be set to be smaller than the total thickness of the liquid crystal layer 40 and the insulating film 35 that will be described later. That is, the upper edge of the wall electrode portions 21a may get away from the second substrate 50.

The second electrode 22 includes the center electrode portion 22a. The center electrode portion 22a is formed on an outer surface of the low wall insulating portion 33, and forms a convex electrode having a height lower than the pair of wall electrode portions 21a. In this embodiment, the low wall insulating portion 33 is formed so that a width W1 of the low wall insulating portion 33 in a direction along which the pair of wall electrode portions 21a faces each other (lateral direction in FIG. 2) is gradually reduced toward the second substrate 50. In the example illustrated in FIG. 2, a cross-section of the low wall insulating portion 33, which is orthogonal to the extending direction of the low wall insulating portion 33, is triangular. For that reason, the low wall insulating portion 33 has an inclined side surface. The center electrode portion 22a is formed on both side surfaces of the low wall insulating portion 33. For that reason, a width of the center electrode portion 22a in the direction along which the pair of wall electrode portions 21a faces each other is also gradually reduced toward the second substrate 50.

With the above configuration, the vertical electric field can be prevented from being developed above the center electrode portion 22a while an aspect ratio of the low wall insulating portion 33 and the center electrode portion 22a is reduced, that is, a bottom width W2 of the low wall insulating portion 33 and the center electrode portion 22a is ensured. This phenomenon will be described with reference to FIGS. 3A and 3B. In FIGS. 3A and 3B, dashed lines represent electric force lines. As illustrated in FIG. 3A, in a structure where a cross-section of a low wall insulating portion 33A is rectangular, the vertical electric field is developed in an area A corresponding to a width of an upper surface of the low wall insulating portion 33A and a center electrode portion 22Aa. In the liquid crystal display device 1, a width of a top of the center electrode portion 22a is very narrow, and the center electrode portion 22a hardly has a surface facing in a vertical direction. For that reason, as illustrated in FIG. 3B, an area in which the vertical electric field is developed is narrower than the area A. An oblique electric field directed toward the first electrode 21 is developed on the surface of the center electrode portion 22a. As a result, as compared with a structure of FIG. 3A, an area in which liquid crystal molecules rotate within a horizontal plane increases so that the transmittance of a light can be improved. Also, as illustrated in FIG. 3A, when a cross-section of the low wall insulating portion is rectangular, the transmittance of the light is reduced more as the bottom width of the low wall insulating portion becomes larger. On the contrary, when the cross-section of the low wall insulating portion is triangular as illustrated in FIG. 3B, the transmittance of the light can be prevented from being decreased even if the bottom width is set to be larger. As described above, the wall electrode portions 21a of the first electrode 21 is formed to be substantially perpendicular to the first substrate 10. For that reason, an angle of the side surface of the center electrode portion 22a to the first substrate 10 is smaller than an angle of the wall electrode portions 21a to the first substrate 10.

The bottom width of the low wall insulating portion 33 is smaller than, for example, the height of the low wall insulating portion 33. That is, the bottom width W2 of the center electrode portion 22a is smaller than, for example, the height of the center electrode portion 22a. With this configuration, the angle of the side surface of the center electrode portion 22a to the first substrate 10 becomes larger. As a result, a lateral electric field is liable to be developed between the center electrode portion 22a and the wall electrode portions 21a. Also, the bottom width W2 of the center electrode portion 22a may be larger than the height of the center electrode portion 22a. That is, the bottom width of the low wall insulating portion 33 may be larger than the height of the low wall insulating portion 33. With this configuration, the aspect ratio of the center electrode portion 22a and the low wall insulating portion 33 becomes smaller, and it is easy to stably form the center electrode portion 22a and the low wall insulating portion 33. The low wall insulating portion 33 can be formed by, for example, oblique exposure for applying a light obliquely to a material of the low wall insulating portion 33, or a resist forming the low wall insulating portion 33.

As illustrated in FIG. 2, in this example, the second electrode 22 is formed on not only the low wall insulating portion 33, but also the outer surface of the high wall insulating portions 32, and the insulating film 36. That is, the second electrode 22 is continuously formed over the plurality of adjacent pixels. In detail, the second electrode 22 includes a second planar electrode portion 22b enlarged from the center electrode portion 22a toward the high wall insulating portion 32, and a wall electrode portion 22c formed on the outer surface (side surface and upper surface) of the high wall insulating portions 32. The wall electrode portion 22c is formed on both the side surfaces and the upper surface of each high wall insulating portion 32, and connected to the second planar electrode portions 22b of the adjacent two pixels. With this configuration, an electric resistance of the second electrode 22 can be reduced. The respective portions of the second electrode 22 are covered with an insulating film 34, and the respective portions of the first electrode 21 are formed on the insulating film 34. Accordingly, the insulating film 34 is interposed between the wall electrode portion 22c of the second electrode 22 and the wall electrode portion 21a of the first electrode 21.

In this example, as illustrated in FIG. 2, the first electrode 21 has a first planar electrode portion 21b that covers the second planar electrode portion 22b. That is, the first planar electrode portion 21b faces the second planar electrode portion 22b through the insulating film 34. The first planar electrode portion 21b is formed between lower edges of the pair of wall electrode portions 21a, and substantially in parallel to the first substrate 10. The first planar electrode portion 21b is formed with an opening (slit) 21c for exposing the center electrode portion 22a to the liquid crystal layer 40. In other words, the first planar electrode portion 21b is enlarged from the lower edge of the wall electrode portions 21a toward the low wall insulating portion 33, and the edge reaches abase of the low wall insulating portion 33. The first planar electrode portion 21b can prevent an electric field from being developed between the second planar electrode portion 22b of the second electrode 22 and the wall electrode portions 21a. In other words, the first planar electrode portion 21b blocks the vertical electric field developed on the surface of the second planar electrode portion 22b. As a result, the electric field parallel to the liquid crystal layer 40 is liable to be developed. As illustrated in FIG. 1, the first planar electrode portion 21b has a portion 21d that is enlarged in a direction along the video signal lines 11 beyond the low wall insulating portion 33 and the second planar electrode portion 22b. Two portions (a right portion and a left portion of FIG. 2) of the first planar electrode portion 21b located on opposite sides with respect to the low wall insulating portion 33 are electrically connected to each other through a portion 22d.

As illustrated in FIG. 2, the insulating film 35 is formed between the pair of wall electrode portions 21a. The insulating film 35 is formed on the first planar electrode portion 21b. In the example illustrated in FIG. 2, the center electrode portion 22a and the insulating film 34 that covers the center electrode portion 22a are embedded in the insulating film 35. In other words, the thickness of the insulating film 35 is substantially equal to the height of the center electrode portion 22a. The height of the surface (surface of the liquid crystal layer 40 side) of the insulating film 35 is substantially even between the pair of wall electrode portions 21a. The liquid crystal layer 40 is formed on the insulating film 35. For that reason, the thickness of the liquid crystal layer 40 can be prevented from changing between the pair of wall electrode portions 21a by the center electrode portion 22a, that is, the liquid crystal layer 40 can be prevented from being thinned on the upper side of the center electrode portion 22a. As a result, the transmittance of the light is equalized within one pixel. The thickness of the insulating film 35 may be thicker than the thickness of the center electrode portion 22a.

As described above, because the first electrode 21 includes the first planar electrode portion 21b, as illustrated in FIG. 3B, an electric field is also developed between the first planar electrode portion 21b and the center electrode portion 22a. The electric field contains a vertical electric field component more than the electric field developed between the wall electrode portions 21a and the center electrode portion 22a. The insulating film 35 is formed on the first planar electrode portion 21b with the result that the vertical electric field component can be prevented from being developed in the liquid crystal layer 40.

As described above, the low wall insulating portion 33 and the center electrode portion 22a extend along the wall electrode portions 21a. As illustrated in FIG. 1, in this example, the center electrode portion 22a has inclined portions 22e bent toward one wall electrode portion 21a, on both ends thereof. Also, the other wall electrode portion 21a and the high wall insulating portions 32 formed with the wall electrode portion 21a have portions 21e and 32e projected toward the inclined portions 22e, respectively. With this configuration, a width between an end of the center electrode portion 22a and an end of the wall electrode portions 21a is narrowed. As a result, the electric field developed in an area outside of the pixel can be prevented from affecting the rotation of the liquid crystal molecules in the vicinity of those ends.

As illustrated in FIG. 2, the color filters 51 are formed on the second substrate 50 in correspondence with the respective pixels. Also, a black matrix 52 is formed on the second substrate 50 in a boundary portion between the adjacent pixels. The black matrix 52 and the high wall insulating portions 32 face each other in the thickness direction of the liquid crystal display device 1. For that reason, as described above, the high wall insulating portions 32 may not always be made of a transparent insulating material. An overcoat layer 53 is formed on the color filters 51, that is, on a surface of the color filters 51 at the liquid crystal layer 40 side.

Figure 4:
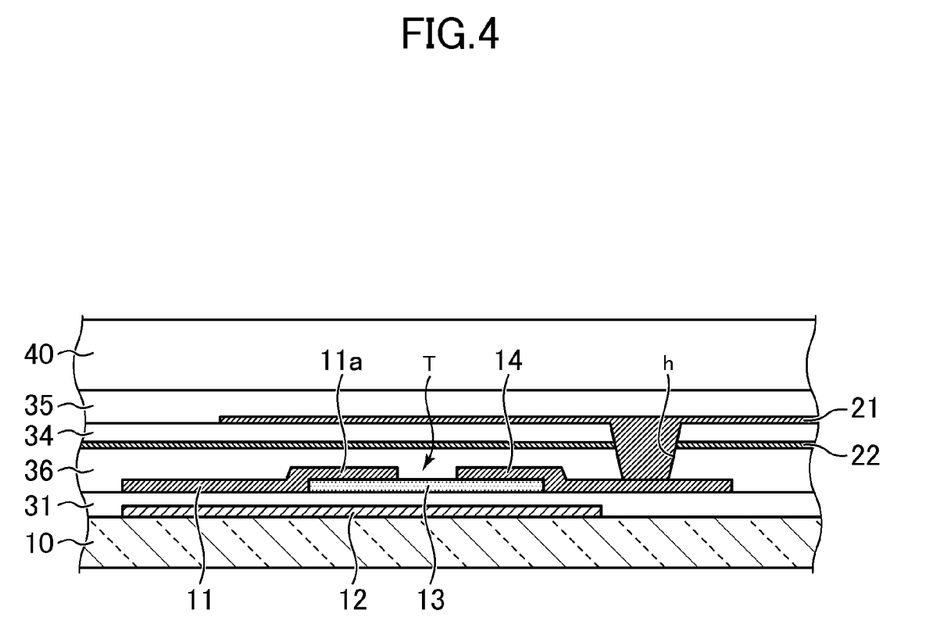
FIG. 4 is a cross-sectional view of the liquid crystal display device taken along a line IV-IV illustrated in FIG. 1, a thin film transistor is illustrated in this drawing.

FIG. 4 is a cross-sectional view of the liquid crystal display device 1 taken along a line IV-IV illustrated in FIG. 1. In this drawing, the thin film transistor T is illustrated. In the drawing, the second substrate 50 is omitted.

As illustrated in FIGS. 1 and 4, the first substrate 10 is formed with the video signal lines (gate electrode lines) 11. The scanning signal lines 12 is covered with the gate insulating film 31. The above-mentioned video signal lines (drain electrode lines) 11 and a semiconductor layer 13 are formed on the gate insulating film 31. A drain electrode 11a connected to the video signal line 11, and a source electrode 14 are formed on the semiconductor layer 13. The insulating film 36 that covers the semiconductor layer 13, the video signal line 11, the drain electrode 11a, and the source electrode 14 is formed on the gate insulating film 31. The second electrode 22 is formed on the insulating film 36. The insulating film 34 is formed on the second electrode 22. The first electrode 21 is formed on the insulating film 34. As described above, in the example described here, the first electrode 21 is the pixel electrode applied with the gradation voltage. For that reason, the first electrode 21 is connected to the source electrode 14 through a through-hole h formed in the insulating film 34, the second electrode 22, and the insulating film 36.

Figure 5:
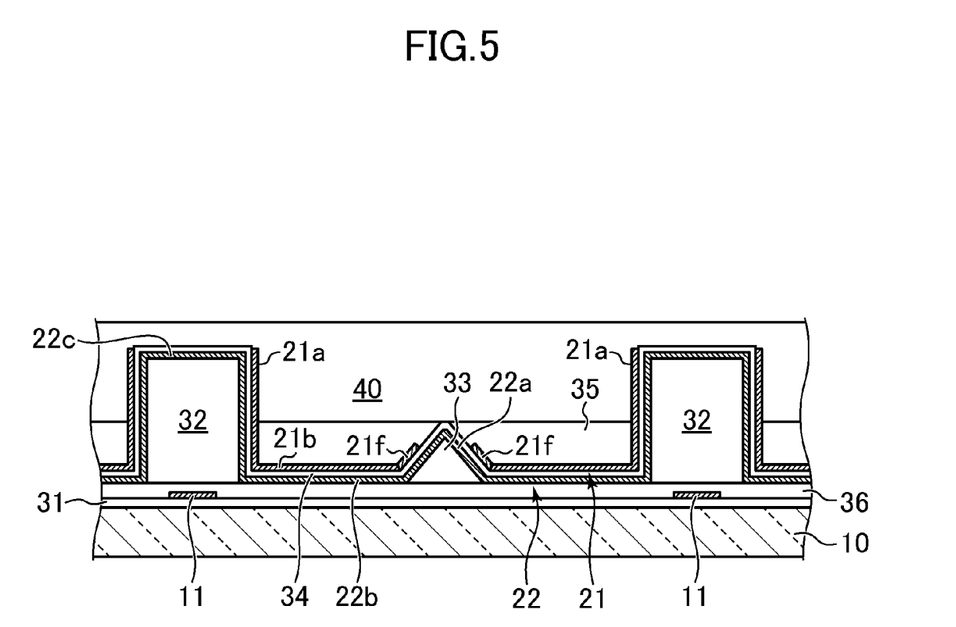
FIG. 5 is a cross-sectional view illustrating one modified example of the liquid crystal display device.

FIG. 5 is a cross-sectional view illustrating one modified example of the liquid crystal display device 1. The cross-section of FIG. 5 is identical with that of FIG. 2. In this drawing, the second substrate 50 is omitted. In this drawing, the same parts as those described above are denoted by identical symbols. In this example, parts different from those described with reference to FIGS. 1, 2, and 4 will be described, and parts not described are identical with those drawings.

In an example illustrated in FIG. 5, the first electrode 21 includes a pair of slope electrode portions 21f in addition to the above-mentioned wall electrode portions 21a and first planar electrode portion 21b. The pair of slope electrode portions 21f is projected toward the low wall insulating portion 33 from the edge of the first planar electrode portion 21b. The respective slope electrode portions 21f are formed on both of slopes of the low wall insulating portion 33, and extend in the extending direction of the low wall insulating portion 33. The slope electrode portions 21f face the center electrode portion 22a through the insulating film 34 that covers the second electrode 22. A height of the slope electrode portions 21f is lower than the height of the center electrode portion 22a. For that reason, an upper portion of the center electrode portion 22a is exposed to the liquid crystal layer 40 from between upper edges of the pair of slope electrode portions 21f. With this structure, a fringe electric field is liable to be developed between the slope electrode portions 21f and the upper portion of the center electrode portion 22a. As a result, the liquid crystal layer 40 located on the upper side of the center electrode portion 22a is further liable to rotate, and the transmittance of the light of the pixels can be further improved.

Figure 6:
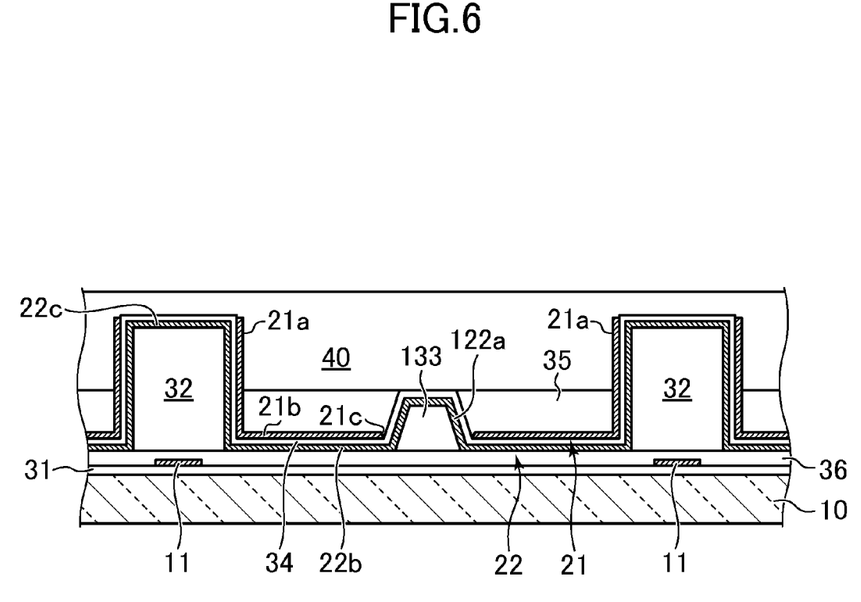
FIG. 6 is a cross-sectional view illustrating another modified example of the liquid crystal display device.

FIG. 6 is a cross-sectional view illustrating another modified example of the liquid crystal display device 1. The cross-section of FIG. 6 is identical with that of FIG. 2. In this drawing, the second substrate 50 is omitted. In the drawing, the same parts described above are denoted by identical reference numerals or symbols. In this example, parts different from the examples described with reference to FIGS. 1, 2, and 4 will be described, and parts not described are identical with those in the examples illustrated in those drawings.

In the example of FIG. 6, the above-mentioned low wall insulating portion 33 is replaced with a low wall insulating portion 133. The low wall insulating portion 133 is formed so that a width of the low wall insulating portion 133 in a direction along which the pair of wall electrode portions 21a faces each other is gradually reduced toward the second substrate 50. In particular, in this example, a cross-section of the low wall insulating portion 133, which is orthogonal to the extending direction of the low wall insulating portion 133, is trapezoidal. Therefore, a width of an upper surface (surface of the liquid crystal layer 40 side) of the low wall insulating portion 133 is smaller than a bottom width of the low wall insulating portion 133. The second electrode 22 has a center electrode portion 122a formed on an outer surface of the low wall insulating portion 133. That is, the center electrode portion 122a is formed by both of slopes (both side surfaces) and an upper surface of the low wall insulating portion 133. Therefore, a cross-section of the center electrode portion 122a is also trapezoidal. The center electrode portion 122a is exposed to the liquid crystal layer 40 from the slit 21c formed in the first planar electrode portion 21b. The center electrode portion 122a is also covered with the insulating film 34 as with the center electrode portion 22a.

Also, in this configuration, the vertical electric field can be prevented from being developed above the center electrode portion 122a while an aspect ratio of the low wall insulating portion 133 and the center electrode portion 122a is reduced, that is, a bottom width of the low wall insulating portion 133 and the center electrode portion 122a is ensured. Also, if the cross-section of the low wall insulating portion is rectangular as illustrated in FIG. 3A, the transmittance of the light is reduced more as the bottom width of the low wall insulating portion is larger. On the contrary, if the cross-section of the low wall insulating portion is trapezoidal as illustrated in FIG. 6, a reduction in the transmittance of the light caused by an increase in the bottom width can be suppressed as compared with the case in which the cross-section of the low wall insulating portion is rectangular.

The bottom width of the low wall insulating portion 133 is smaller than, for example, a height thereof. That is, the bottom width of the center electrode portion 122a is smaller than the height of the center electrode portion 122a. With this configuration, an angle of the slope of the center electrode portion 122a to the first substrate 10 become larger. As a result, the horizontal electric field is liable to be developed between the center electrode portion 122a and the wall electrode portions 21a. Also, the bottom width of the center electrode portion 122a may be set to be larger than the height of the center electrode portion 122a. That is, the bottom width of the low wall insulating portion 133 may be set to be larger than the height thereof. With this configuration, the aspect ratio of the center electrode portion 122a and the low wall insulating portion 133 becomes smaller, and it is easy to stably form the center electrode portion 122a and the low wall insulating portion 133.

Figure 7:
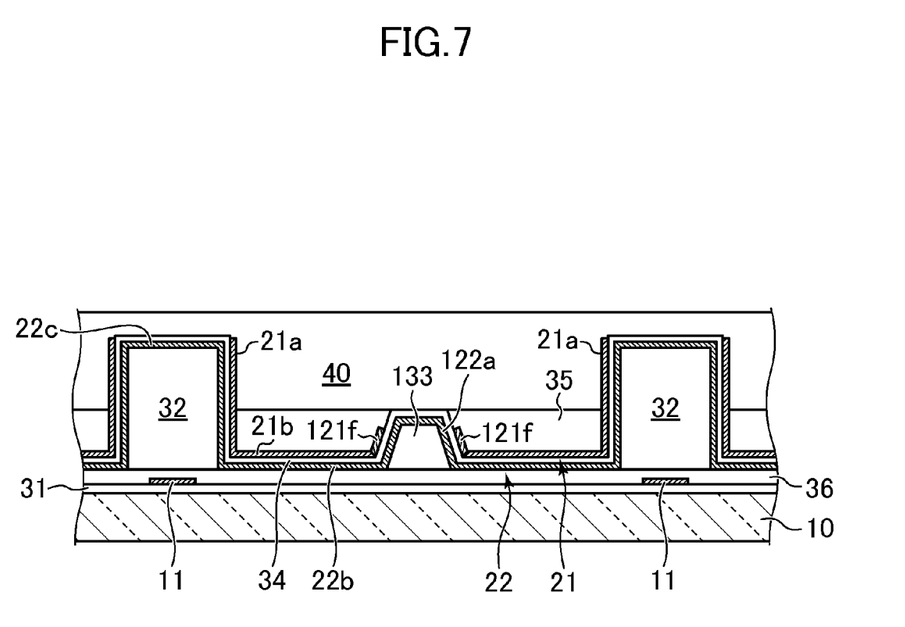
FIG. 7 is a cross-sectional view illustrating still another modified example of the liquid crystal display device.

FIG. 7 is a cross-sectional view illustrating still another modified example of the liquid crystal display device 1. The cross-section of FIG. 7 is identical with that of FIG. 2. In this drawing, the second substrate 50 is omitted. In the drawing, the same parts described above are denoted by identical reference numerals or symbols. In this example, parts different from the examples described with reference to FIGS. 1, 2, 4, and 6 will be described, and parts not described are identical with those in the examples illustrated in those drawings.

In an example illustrated in FIG. 7, the first electrode 21 includes a pair of slope electrode portions 121f in addition to the above-mentioned wall electrode portions 21a and first planar electrode portion 21b. The pair of slope electrode portions 121f is projected toward the low wall insulating portion 133 from the edge of the first planar electrode portion 21b. The respective slope electrode portions 121f are formed on both of slopes of the low wall insulating portion 133, and extend in the extending direction of the low wall insulating portion 133. The slope electrode portions 121f face the center electrode portion 122a through the insulating film 34 that covers the second electrode 122. A height of the slope electrode portions 121f is lower than the height of the center electrode portion 122a. For that reason, an upper portion of the center electrode portion 122a is exposed to the liquid crystal layer 40 from between upper edges of the pair of slope electrode portions 121f. With this structure, a fringe electric field is liable to be developed between the slope electrode portions 121f and the upper portion of the center electrode portion 122a. As a result, the liquid crystal layer 40 located on the upper side of the center electrode portion 122a is further liable to rotate, and the transmittance of the light of the pixels can be further improved.

Figure 8:
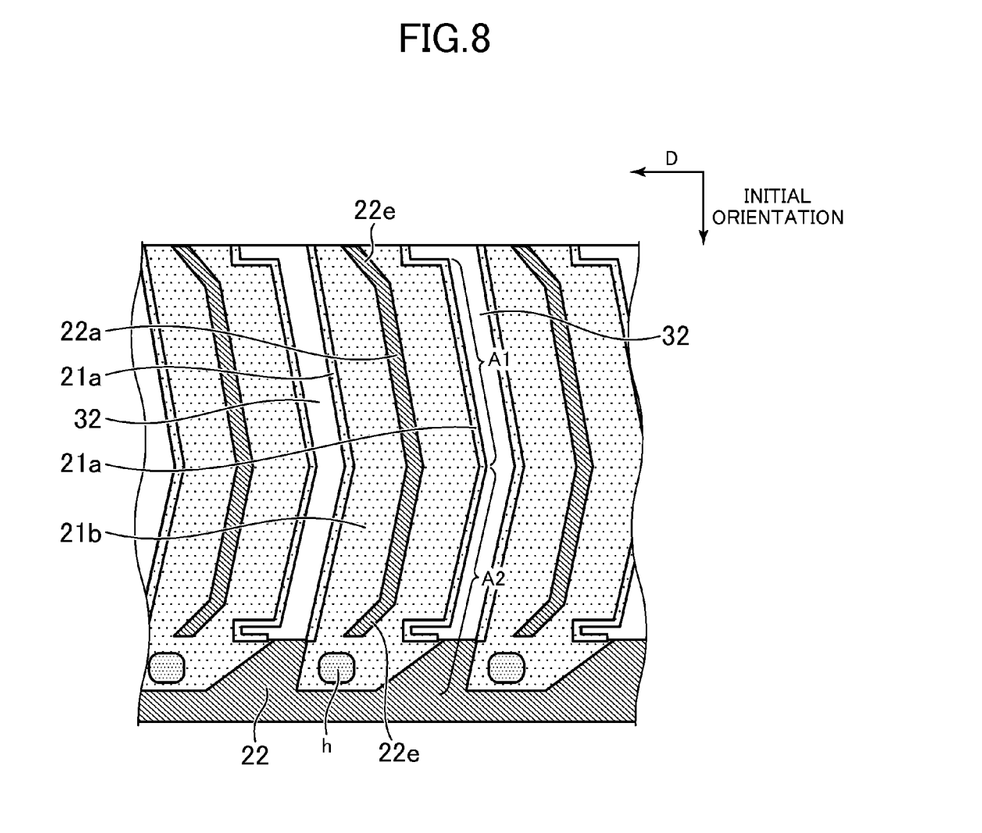
FIG. 8 is a plan view of a liquid crystal display device in which pixels having a multi-domain structure are formed.

Each pixel of the liquid crystal display device 1 may have a multi-domain structure. FIG. 8 is a plan view illustrating each pixel in this example. In this drawing, the same parts described above are denoted by identical reference numerals or symbols. In this example, the scanning signal lines 12 and the video signal lines 11 are omitted.

In an example illustrated in FIG. 8, each of the pixels has two areas A1 and A2 into which the pixel is divided in the extending direction of the video signal line 11. In one area A1, the high wall insulating portions 32, the wall electrode portions 21a, the low wall insulating portion 33, and the center electrode portion 22a are inclined in a direction D orthogonal to an initial orientation direction of the liquid crystal molecules. Similarly, in the other area A2, the high wall insulating portions 32, the wall electrode portions 21a, the low wall insulating portion 33, and the center electrode portion 22a are inclined in the direction D. With this structure, a viewing angle can be widened as compared with the example illustrated in FIG. 1. Also, in the example of the multi-domain structure illustrated in FIG. 8, the low wall insulating portion 33 may have a triangular cross-section or a trapezoidal cross-section. Also, the first electrode 21 may include the slope electrode portions 21f and 121f.

The present invention is not limited to the liquid crystal display device 1 described above, but can be variously changed.

For example, the first electrode 21 may function as the common electrode, and the second electrode 22 function as the pixel electrodes. In this case, the through-hole h connecting the second electrode 22 and the source electrode 14 may be formed in the insulating film 36.

Also, the cross-sections of the low wall insulating portion 33 and the center electrode portion 22a may not be triangular or trapezoidal. For example, a top of those cross-sections may be rounded.

Also, the second electrode 22 may not always include the wall electrode portion 22c.

Also, the second electrode 22 may not always include the second planar electrode portion 22b. In this case, the first electrode 21 may not include the first planar electrode portion 21b.

Also, the first planar electrode portion 21b of the first electrode 21 may not always reach the low wall insulating portion 33.

Also, the high wall insulating portions 32 and the low wall insulating portion 33 may not always be formed. For example, a portion where the low wall insulating portion 33 is formed may be made of a material of the center electrode portion 22a. A portion where the high wall insulating portions 32 is formed may be made of a material of the wall electrode portions 21a.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
a first substrate that has a plurality of scanning signal lines, a plurality of video signal lines that intersects with the plurality of scanning signal lines, and a plurality of pixels each being surrounded by two adjacent scanning signal lines and two adjacent video signal lines;
a second substrate that faces the first substrate;
a liquid crystal layer that is disposed between the first substrate and the second substrate;
a first electrode comprising a first planar electrode portion and a pair of wall electrode portions facing each other which is each disposed on the first substrate, functions as one of pixel electrodes and a common electrode, is formed on each of the plurality of pixels, and takes a posture of standing on the first substrate;
a center electrode that is disposed on the first substrate, functions as the other of the pixel electrodes and the common electrode, extends along the pair of wall electrode portions between the pair of wall electrode portions has a convexity lower in height than the pair of wall electrode portions and makes a width in a direction along which the pair of wall electrode portions faces each other gradually smaller toward the second substrate; and
a first insulating film,
wherein the first planar electrode portion and the center electrode are embedded in the first insulating film and the liquid crystal layer is on the first insulating film.

2. The liquid crystal display device according to claim 1,
wherein a pair of high wall insulating portions is each located on two edges positioned on opposite sides of each of the pixels,
wherein a low wall insulating portion that has a height lower than the pair of high wall insulating portions, and has a width in the direction along which the pair of wall electrode portions faces each other gradually smaller toward the second substrate is formed between the pair of high wall insulating portions,
wherein the pair of wall electrode portions is formed on each side wall of the pair of high wall insulating portions, and
wherein the center electrode is formed on an outer surface of the low wall insulating portion.

3. The liquid crystal display device according to claim 2,
wherein a cross-section of the low wall insulating portion orthogonal to an extending direction of the low wall insulating portion is triangular.

4. The liquid crystal display device according to claim 3,
wherein the center electrode is covered with a second insulating film,
wherein one electrode portion of the first electrode is a low wall electrode portion that is formed on the low wall insulating portion, and
wherein the low wall electrode portion is positioned facing the center electrode through the second insulating film.

5. The liquid crystal display device according to claim 2,
wherein a cross-section of the low wall insulating portion orthogonal to an extending direction of the low wall insulating portion is trapezoidal.

6. The liquid crystal display device according to claim 5,
wherein the center electrode is covered with a second insulating film,
wherein one electrode portion of the first electrode is a low wall electrode portion that is formed on the low wall insulating portion, and
wherein the low wall electrode portion is positioned facing the center electrode through the second insulating film.

7. The liquid crystal display device according to claim 1,
wherein the center electrode is formed over adjacent two or more pixels of the plurality of pixels.

* * * * *